United States Patent
Yamamoto (12)

(10) Patent No.: US 6,295,166 B1
(45) Date of Patent: Sep. 25, 2001

(54) PROJECTION LENS FOR PROJECTION TYPE OF TELEVISION SYSTEM

(75) Inventor: Chikara Yamamoto, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/280,080

(22) Filed: Mar. 29, 1999

Related U.S. Application Data (63) Continuation-in-part of application No. 08/915,686, filed on Aug. 21, 1997, now abandoned.

(30) Foreign Application Priority Data

Aug. 22, 1996  (JP) .................................................. 8-241068

(51) Int. Cl.⁷ ................................ G02B 3/00; G02B 9/00
(52) U.S. Cl. .............................................. 359/649; 359/769
(58) Field of Search .................................... 359/649, 650, 359/663, 769, 767, 763–764, 760, 759, 754–757

(56) References Cited

U.S. PATENT DOCUMENTS

| | | | |
|---|---|---|---|
| 3,575,495 | 4/1971 | Tibbetts | ................................. 359/769 |
| 5,257,134 | * 10/1993 | Sugawara | .............................. 359/676 |
| 5,764,419 | * 6/1998 | Kodama et al. | ...................... 359/676 |

* cited by examiner

Primary Examiner—Jordan M. Schwartz
(74) Attorney, Agent, or Firm—Young & Thompson (57) ABSTRACT

A projection lens for a projection type of television system which comprises a positive power first lens having a convex surface on the image side, a positive power second lens having a convex surface on the image side, third biconcave lens, a positive power fourth meniscus lens having a convex surface on the object side and a positive power fifth lens having a convex surface on the image side arranged in order from the image side to the object side satisfies the following conditions:

$$0.35 < F_{12}/F < 0.65$$

$$-3.0 < F_3/F < -1.3$$

$$0.5 < F_5/F < 0.85$$

$$0.35 < BF/F < 0.55$$

where $F_{12}$ is the composite focal length of the first and second lens elements, $F_3$ is the focal length of the third lens element, $F_5$ is the focal length of the fifth lens element, F is the focal length of the projection lens, and BF is the back focal distance of the projection lens.

12 Claims, 5 Drawing Sheets

PROJECTION LENS FOR PROJECTION TYPE OF TELEVISION SYSTEM

This application is a continuation-in-part of U.S. application Ser. No. 08/915,686, filed Aug. 21, 1997 abandoned.

BACKGROUND OF THE INVENTION

1. Field of the Invention

This invention relates to a projection lens system for a projection type of television which is applicable to cameras, such as electronic cameras using charge coupled devices or image pickup devices as image recording media and cameras for use with silver films as image recording media.

2. Description of Related Art

Typically, projection lenses for television sets of the type having a liquid crystal screen have a need to employ a telecentric optical system therein in interrelation to a liquid crystal panel, an illumination system and a color composing optical system and/or to have a long back focal distance in order to incorporate the telecentric optical system therein. One of the projection lenses which satisfy these needs is known from, for example, Japanese Unexamined Patent Publication No. 63-81414. This prior art projection lens comprises a less number of lens elements than before and has a back focal distance longer as compared with its focal length, realizing a desired telecentric optical system.

Projection lens having a back focal distance longer as compared with its focal length are confronted with an large-sized external shape. While projection systems using a liquid crystal device throw a picture with distortion enhanced more than a pictures on an ordinary television screen or a printed picture, and hence have to kept distortion as less as possible, the prior art projection lens described in the above mentioned publication is still hard to have sufficiently corrected distortion.

SUMMARY OF THE INVENTION

It is accordingly an object of the invention to provide a telecentric projection lens which has a back focal distance necessary to put a supplemental optical system, such as a color composing lens system, therein and is sufficiently corrected in distortion.

The foregoing object of the invention is accomplished by providing a projection lens for a projection type of television system which comprises, in order from the image side or the side of magnification to the object side or the side of reduction, a positive power first lens element having a convex surface on the image side, a positive power second lens element having a convex surface on the image side, a biconcave third lens element, a positive power meniscus fourth lens element having a convex surface on the object side and a positive power fifth lens element having a convex surface on the image side satisfies the following conditions:

$$0.35 < F_{12}/F < 0.65$$

$$-0.30 < F_3/F < -0.13$$

$$0.5 < F_5/F < 0.85$$

$$0.35 < BF/F < 0.55$$

where $F_{12}$ is the composite focal length of the first and second lens elements;

$F_3$ is the focal length of the third lens element;

$F_5$ is the focal length of the fifth lens element;

$F$ is the focal length of the projection lens; and $BF$ is the back focal distance of the projection lens.

The projection lens is preferable to satisfy the following condition (V):

$$1.2 < R_7/R_8 < 3.2$$

where $R_7$ is the radius of curvature of the image side surface of the fourth lens element; and $R_8$ is the radius of curvature of the object side surface of the fourth lens element.

Further, the projection lens is preferable to shut out an on-axial light bundle on the image side from the object side surface of the first lens element.

The present invention provides a compact projection lens with maintaining well balanced aberrations while having a back focal distance appropriate to incorporate a color composing optical element therein.

BRIEF DESCRIPTION OF THE DRAWINGS

The above and other objects and features of the present invention will be understood from the following description of a specific embodiment thereof when considering in conjunction with the accompanying drawings, in which.

DETAILED DESCRIPTION OF THE SPECIFIC EMBODIMENT

Figure 1:
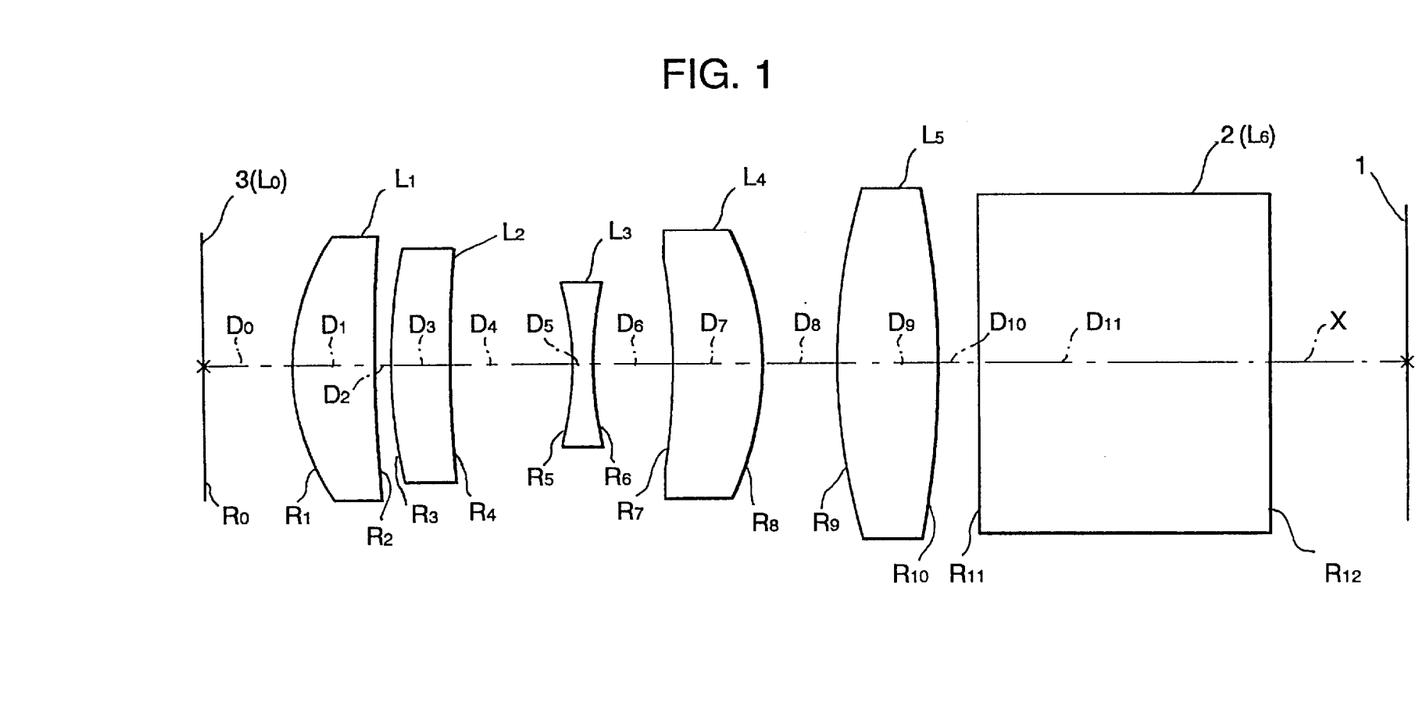
FIG. 1 is a diagrammatic side view of a projection lens embodying the invention.

Referring to the drawings in detail, particularly to FIG. 1 which shows a projection lens embodying the invention as exemplified, the projection lens, which has an F number of 3.00 and an angle of view (2ω) of 21.4°, includes in order from the image side (which refers to the side on which an image is magnified by the projection lens) to the object side (which referes to the side on which an image is reduced by the projection lens) a positive power first lens element $L_1$, a positive power second lens element $L_2$, a negative power third lens element $L_3$, a positive power fourth lens element $L_4$, a positive power fifth lens element $L_5$, and a color composing optical element ($L_6$) 2 coaxially aligned on an optical axis X. An image formed on a liquid crystal display (LCD) 1 is magnified and projected by the projection lens on a television screen (not shown) remote therefrom. The projection lens further includes a light block element ($L_0$) 3 on the image side of the first lens element $L_1$ to shut out an on-axial light bundle.

Each of the first and second lens elements $L_1$ and $L_2$ consists of a positive power meniscus lens having a convex surface on the image side. The third lens element $L_3$ consists of a biconcave lens having a surface of a strong curvature on the image side. The fourth lens element $L_4$ consists of a positive power meniscus lens having a convex surface on the object side. The fifth lens element $L_5$ consists of a biconvex lens having a surface of a strong curvature on the image side.

Figure 2:
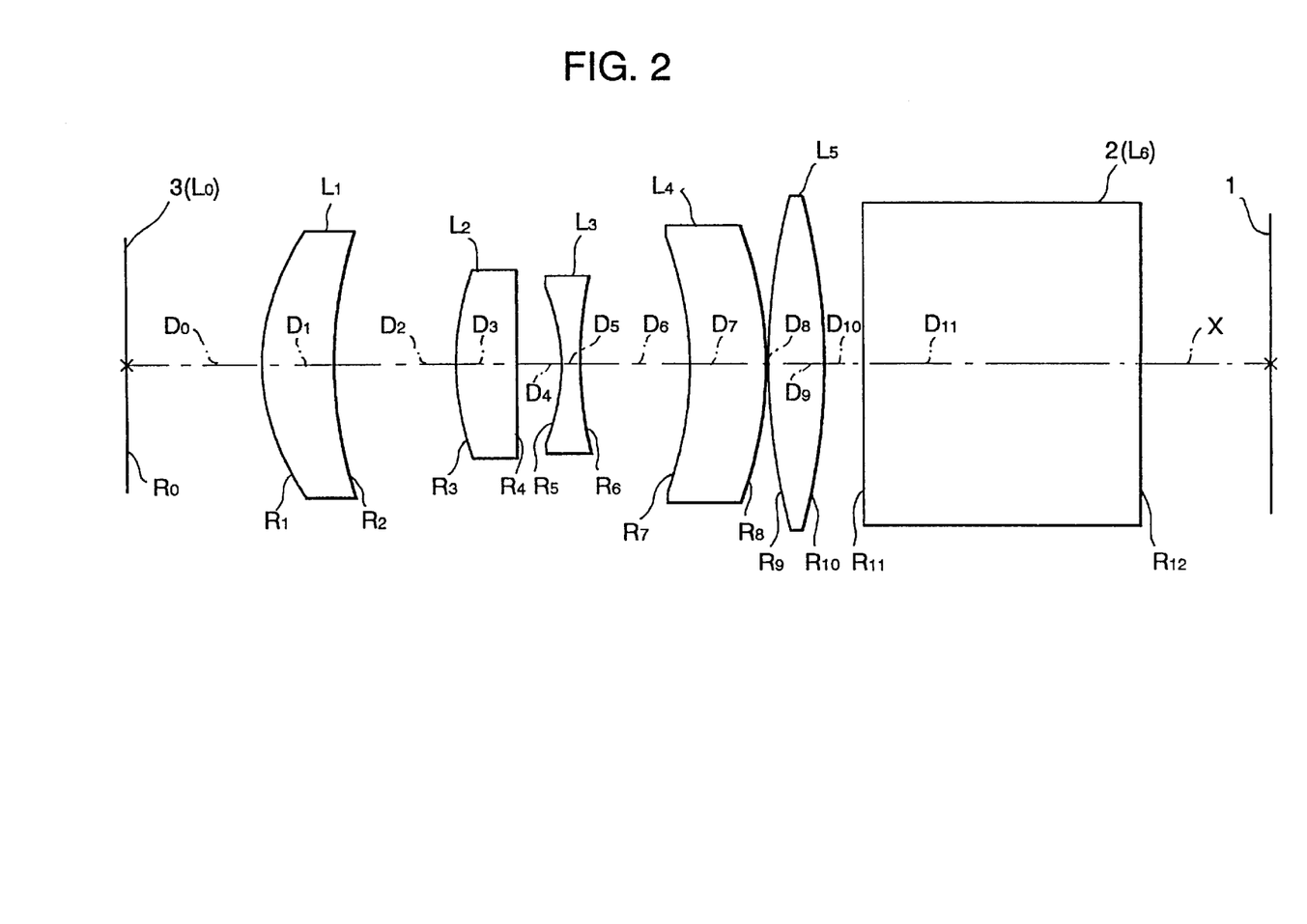
FIG. 2 is a diagrammatic side view of another projection lens embodying the invention.

FIG. 2 shows another projection lens embodying the invention as exemplified, the projection lens, which has an F number of 3.00 and an angle of view (2ω) of 21.8°, includes, in order from the image side or the screen side to the object side, a positive power first lens element $L_1$, a positive power second lens element $L_2$, a negative power third lens element $L_3$, a positive power fourth lens element $L_4$, a positive power fifth lens element $L_5$, and a color composing optical element ($L_6$) 2 coaxially aligned on an optical axis X. An image formed on a liquid crystal display 1 is magnified and projected by the projection lens on a television screen (not shown) remote therefrom. The projection lens further includes a light block element ($L_0$) 3 on the image side of the first lens element $L_1$ to shut out an on-axial light bundle.

First and second lens elements $L_1$ and $L_2$ consist of positive power meniscus lens, each of which has a convex surface on the image side. The third lens element $L_3$ consists of a biconcave lens having a surface of a strong curvature on the image side. The fourth lens element $L_4$ consists of a positive power meniscus lens having a convex surface on the object side. The fifth lens element $L_5$ consists of a biconvex lens having a surface of a strong curvature on the image side. As compared with the projection lens of the first embodiment, the first and second lens elements $L_1$ and $L_2$ are arranged at greater separation therebetween, and the fourth and fifth lens elements $L_4$ and $L_5$ are arranged in closer proximity to each other as compared to the first embodiment of projection lens.

Projection lenses in all embodiments of the invention must satisfy the following conditions (I)–(IV):

$$0.35 < F_{12}/F < 0.65 \quad (I)$$

$$-0.30 < F_3/F < -0.13 \quad (II)$$

$$0.5 < F_5/F < 0.85 \quad (III)$$

$$0.35 < BF/F < 0.55 \quad (IV)$$

where $F_{12}$ is the composite focal length of the first and second lens elements;

$F_3$ is the focal length of the third lens element;

$F_5$ is the focal length of the fifth lens element;

F is the focal length of the projection lens; and

BF is the back focal distance of the projection lens.

Further, the projection lens is preferred to satisfy the following condition (V):

$$1.2 < R_7/R_8 < 3.2 \quad (V)$$

where $R_7$ is the radius of curvature of the image side surface of the fourth lens element; and $R_8$ is the radius of curvature of the object side surface of the fourth lens element.

The parameters set forth are necessary for suitably balancing the aberrations of the projection lens system. Satisfaction of these conditions as set forth above ensures a compact projection lens with an appropriate back focal distance for incorporation of a color composing optical element.

First condition (I) provides the relationship between the focal length of the projection lens and the composite focal length of the first and second lens elements $L_1$ and $L_2$. When the upper limit of the ratio of $F_{12}/F$ is exceeded, the projection lens has to have a too long back focal distance. On the other hand, when the lower limit of the ratio of $F_{12}/F$ is exceeded, the projection lens has to have a too short back focal distance and encounters aggravation of aberrations.

Second condition (II) provides the relationship between the focal lengths of the overall projection lens and the third lens element $L_3$. When either one or both of the upper and lower limits of the ratio of $F_3/F$ are exceeded, it is hard to balance the aberrations of the projection lens and to prevent or significantly reduce aggravation of aberrations.

Third condition (III) provides the relationship between the focal lengths of the overall projection lens and the fifth lens element $L_5$ and yields a back focal distance of the projection lens necessary for incorporation of a color composing optical element. When the upper limit of the ratio of $F_5/F$ is exceeded, the projection lens has to have a too long back focal distance and encounters aggravation of aberrations. On the other hand, when the lower limit of the ratio of $F_5/F$ is exceeded, the projection lens is hard to be free from aberrations, in particular distortion.

Fourth condition (IV) yields the overall compactness of the projection lens. When the upper limit of the ratio of BF/F is exceeded, the projection lens has a long overall length. On the other hand, when the lower limit of the ratio of BF/F is exceeded, the projection lens is hard to incorporate a color composing optical element between the fifth lens element $L_5$ and the LCD 1 at the back focal point.

Fifth condition (V) prevents or significantly reduces aggravation of aberrations, in particular the curvature of field. When the lower limit of the ratio of $R_7/R_8$ is exceeded, it becomes hard to manufacture the fifth lens element $L_5$ itself.

If there is no light block element in the inside of the first lens element or on the image side of the first lens element of a projection lens, in order for the projection lens to block off-axial light rays incident at sharp angles of incidence, the foremost lens element is necessary to be large in diameter, which is always undesirable for a compact construction of the projection lens and, in addition, makes it hard to be of appropriate telecentric design. In contrast in this embodiment, the light block element ($L_0$) 3 disposed on the image side of the first lens element $L_5$ to shut out an on-axial light bundle, the projection lens has no need of a large diameter of foremost lens element and is easy to be of telecentric design.

In the following tables, some specific embodiments of the invention are set forth for the same F number, with the parameters of the invention. In the following prescription tables, the reference L followed by an Arabic numeral indicates the lens element progressively from the image end to the object end of the projection lens. The reference radius numbers R are the progressive surface radii of the elements of the projection lens. Positive surface radii are struck from the right of the surface of the element on the optical axis X, and negative surface radii are struck from the left of the surface of the element on the optical axis X. The reference distance numbers D are the progressive axial distances between adjacent surfaces. Nd is the index of refraction of the lens elements. νd is the dispersion of the lens elements as measured by the Abbe number.

A projection lens as shown in FIG. 1 scaled to an F number of 3.00 and an angle of view (2ω) of 21.4° is substantially described in Table I.

TABLE I

| Element | Radius of Curvature (mm) | Axial distance Between Surfaces (mm) | Nd | νd |
|---|---|---|---|---|
| $L_0$ | $R_0 = \infty$ | $D_0 = 0.1105$ | | |
| | $R_1 = 0.3593$ | $D_1 = 0.0975$ | 1.6301 | 60.0 |
| $L_1$ | $R_2 = 2.5567$ | $D_2 = 0.0232$ | | |
| | $R_3 = 0.8185$ | $D_3 = 0.0668$ | 1.6304 | 59.9 |
| $L_2$ | $R_4 = 1.2028$ | $D_4 = 0.1566$ | | |
| | $R_5 = -0.3651$ | $D_5 = 0.0228$ | 1.8000 | 25.0 |
| $L_3$ | $R_6 = 0.4288$ | $D_6 = 0.0884$ | | |
| | $R_7 = -0.8840$ | $D_7 = 0.1089$ | 1.6588 | 51.4 |
| $L_4$ | $R_8 = -0.3967$ | $D_8 = 0.0958$ | | |
| | $R_9 = 0.5886$ | $D_9 = 0.1262$ | 1.7018 | 41.4 |
| $L_5$ | $R_{10} = -4.4722$ | $D_{10} = 0.0532$ | | |
| | $R_{11} = \infty$ | $D_{11} = 0.3503$ | 1.5163 | 64.1 |
| $L_6$ | $R_{12} = \infty$ | | | |

The projection lens described in the above prescription Table I has values shown as follows and satisfies the conditions (I)–(V):

| $F_{12}/F$ | $F_3/F$ | $F_5/F$ | BF/F | $R_7/R_8$ |
|---|---|---|---|---|
| 0.56 | −0.24 | 0.74 | 0.43 | 2.23 |

Figure 3A:
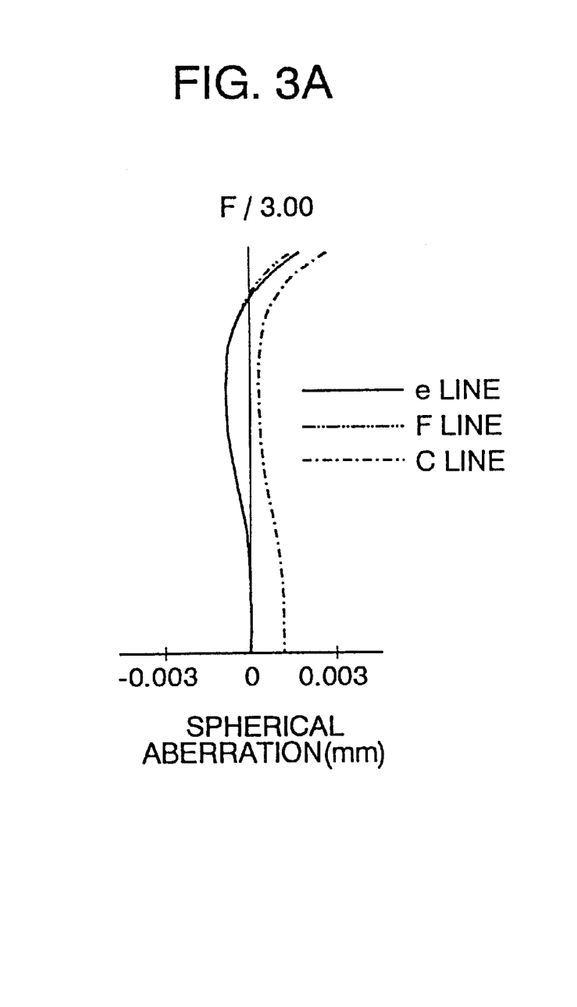
FIGS. 3A, 3B and 3C are graphical views showing spherical aberrations for e-line, F-line and C-line, astigmatism in sagittal and tangential surfaces and distortion, respectively, of the projection lens according to an embodiment of the invention.
Figure 3B:
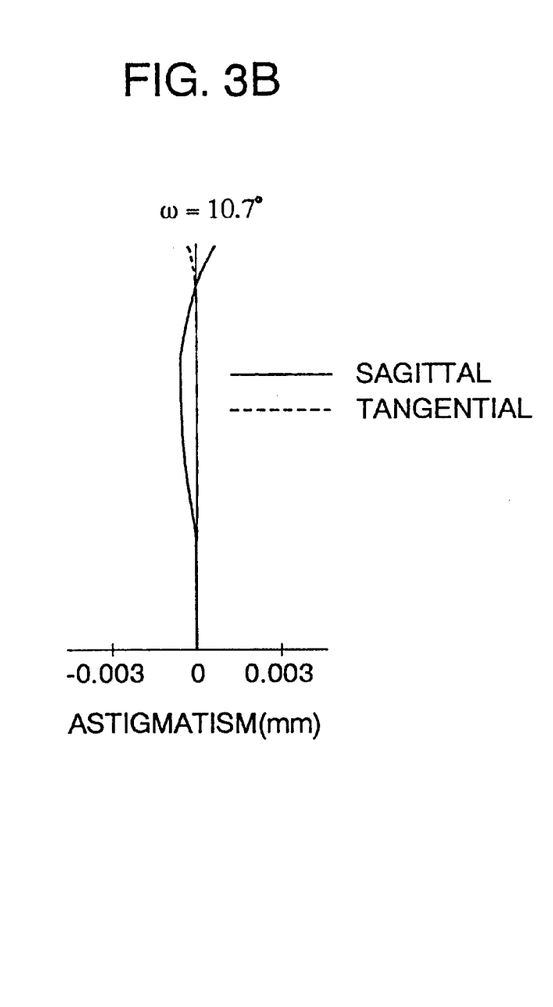
Figure 3C:
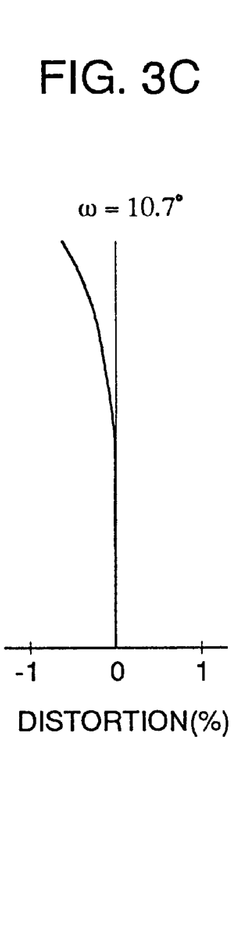

FIGS. 3A, 3B and 3C show spherical aberrations for e-line, F-line and C-line, astigmatism in sagittal and tangential surfaces and distortion, respectively, of the projection lens shown in FIG. 1 and specifically described in Table I. As apparent from FIGS. 3A, 3B and 3C, the projection lens has well balanced aberrations.

A projection lens as shown in FIG. 2 scaled to an F number of 3.00 and an angle of view (2ω) of 21.8° is substantially described in Table II.

TABLE II

| Element | Radius of Curvature (mm) | Axial distance Between Surfaces (mm) | Nd | νd |
|---|---|---|---|---|
| $L_0$ | $R_0 = \infty$ | $D_0 = 0.0836$ | | |
| | $R_1 = 0.3007$ | $D_1 = 0.0932$ | 1.6204 | 60.4 |
| $L_1$ | $R_2 = 0.6069$ | $D_2 = 0.1576$ | | |
| | $R_3 = 0.4082$ | $D_3 = 0.0789$ | 1.6204 | 60.4 |
| $L_2$ | $R_4 = 5.2038$ | $D_4 = 0.0639$ | | |
| | $R_5 = -0.2777$ | $D_5 = 0.0201$ | 1.8052 | 25.5 |
| $L_3$ | $R_6 = 0.4321$ | $D_6 = 0.1421$ | | |
| | $R_7 = -0.7541$ | $D_7 = 0.1059$ | 1.6700 | 47.2 |
| $L_4$ | $R_8 = -0.4968$ | $D_8 = 0.0023$ | | |
| | $R_9 = 0.8614$ | $D_9 = 0.0746$ | 1.7015 | 41.1 |
| $L_5$ | $R_{10} = -0.8225$ | $D_{10} = 0.0540$ | | |
| | $R_{11} = \infty$ | $D_{11} = 0.3556$ | 1.5163 | 64.1 |
| $L_6$ | $R_{12} = \infty$ | | | |

The projection lens described in the above prescription Table II has values shown as follows and satisfies the conditions (I)–(V):

| $F_{12}/F$ | $F_3/F$ | $F_5/F$ | BF/F | $R_7/R_8$ |
|---|---|---|---|---|
| 0.46 | −0.21 | 0.61 | 0.44 | 1.52 |

Figure 4A:
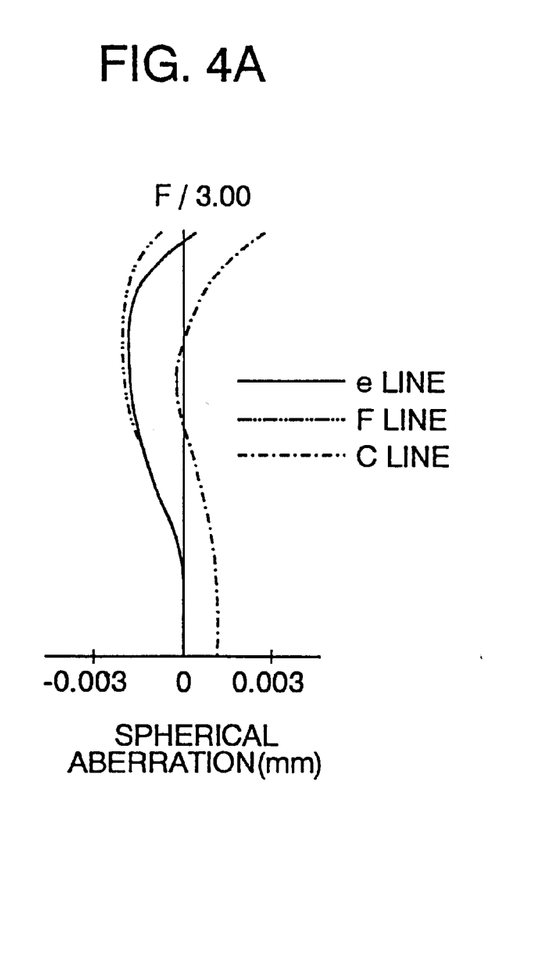
FIGS. 4A, 4B and 4C are graphical views showing spherical aberrations for e-line, F-line and C-line, astigmatism in sagittal and tangential surfaces and distortion, respectively, of the projection lens according to another embodiment of the invention.
Figure 4B:
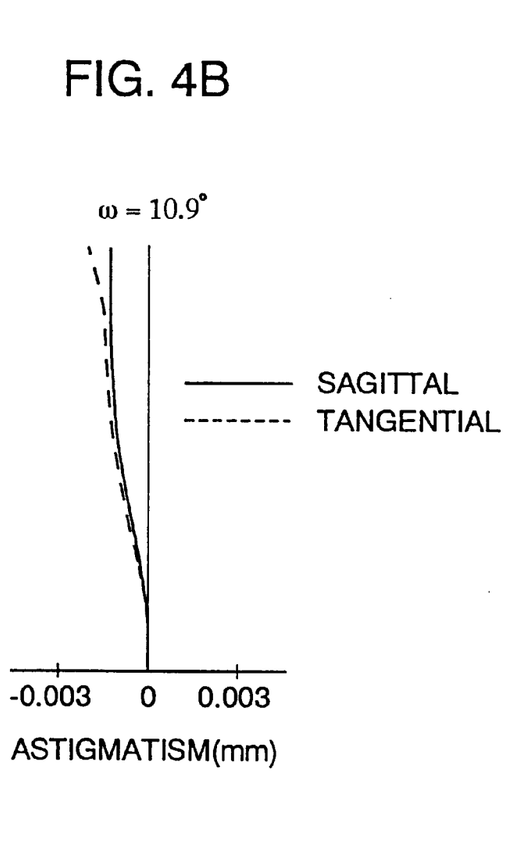
Figure 4C:
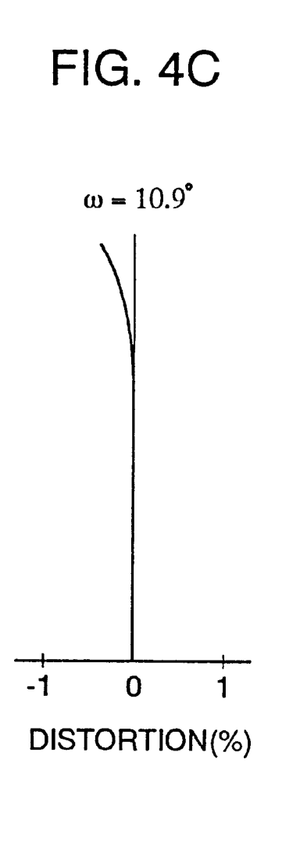

FIGS. 4A, 4B and 4C show spherical aberrations for e-line, F-line and C-line, astigmatism in sagittal and tangential surfaces and distortion, respectively, of the projection lens shown in FIG. 2 and specifically described in Table II. As apparent from FIGS. 4A, 4B and 4C, the projection lens has well balanced aberrations.

A projection lens scaled to an F number of 3.00 and an angle of view (2ω) of 21.8°, which is similar in structure to that shown in FIG. 2, is substantially described in Table III.

TABLE III

| Element | Radius of Curvature (mm) | Axial distance Between Surfaces (mm) | Nd | νd |
|---|---|---|---|---|
| $L_0$ | $R_0 = \infty$ | $D_0 = 0.0247$ | | |
| | $R_1 = 0.2944$ | $D_1 = 0.0925$ | 1.6204 | 60.4 |
| $L_1$ | $R_2 = 0.5476$ | $D_2 = 0.1559$ | | |
| | $R_3 = 0.3868$ | $D_3 = 0.0817$ | 1.6204 | 60.4 |
| $L_2$ | $R_4 = 27.4476$ | $D_4 = 0.0591$ | | |
| | $R_5 = -0.2803$ | $D_5 = 0.0201$ | 1.8052 | 25.5 |
| $L_3$ | $R_6 = 0.4195$ | $D_6 = 0.1614$ | | |
| | $R_7 = -0.9157$ | $D_7 = 0.1038$ | 1.6700 | 47.2 |
| $L_4$ | $R_8 = -0.5622$ | $D_8 = 0.0023$ | | |
| | $R_9 = 0.9271$ | $D_9 = 0.0722$ | 1.7015 | 41.4 |
| $L_5$ | $R_{10} = -0.7941$ | $D_{10} = 0.0540$ | | |
| | $R_{11} = \infty$ | $D_{11} = 0.3557$ | 1.5163 | 64.1 |
| $L_6$ | $R_{12} = \infty$ | | | |

The projection lens described in the above prescription Table III has values shown as follows and satisfies the conditions (I)–(V):

| $F_{12}/F$ | $F_3/F$ | $F_5/F$ | BF/F | $R_7/R_8$ |
|---|---|---|---|---|
| 0.45 | −0.20 | 0.62 | 0.44 | 1.63 |

Figure 5A:
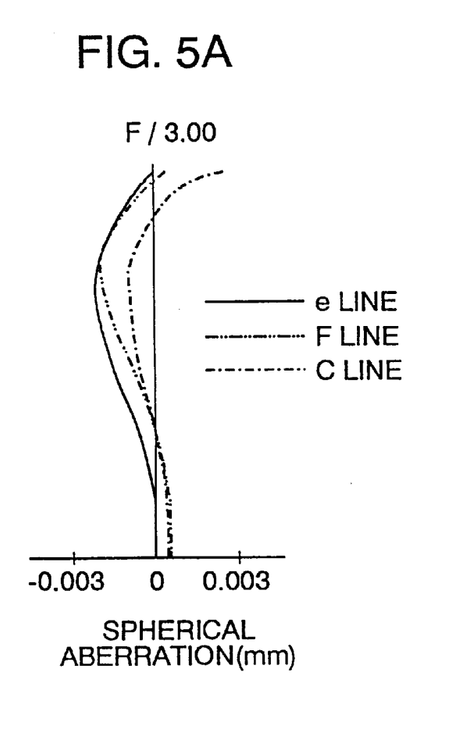
FIGS. 5A, 5B and 5C are graphical views showing spherical aberrations for e-line, F-line and C-line, astigmatism in sagittal and tangential surfaces and distortion, respectively, of the projection lens according to still another embodiment of the invention.
Figures 5B, 5C:
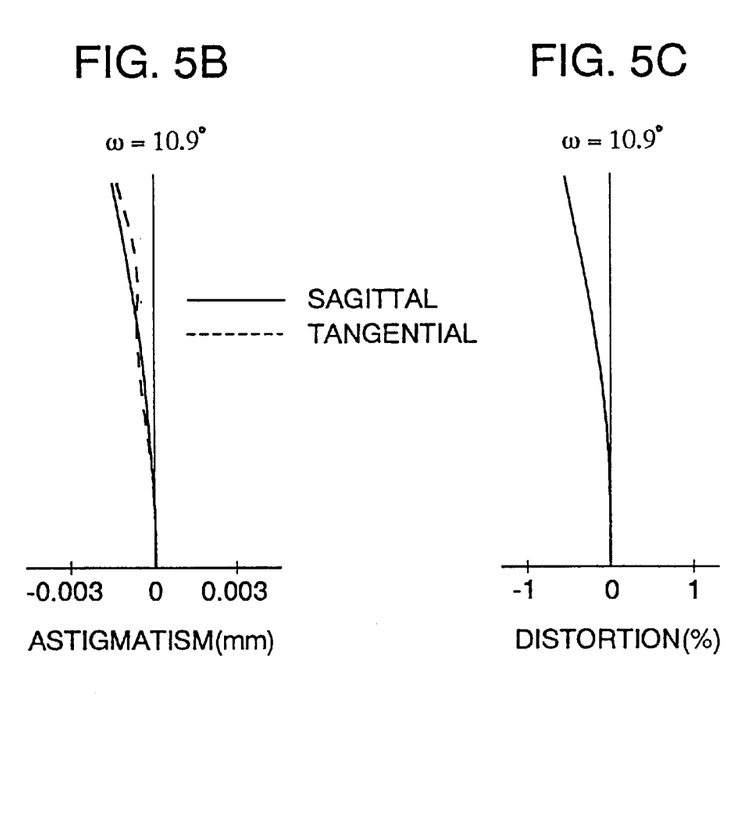

FIGS. 5A, 5B and 5C show spherical aberrations for e-line, F-line and C-line, astigmatism in sagittal and tangential surfaces and distortion, respectively, of the projection lens specifically described in Table III. As apparent from FIGS. 5A, 5B and 5C, the projection lens has well balanced aberrations.

Although the lens of the invention has been described as a projection lens for a TV projector in each of the above embodiments, it may be utilized as an image forming lens for various types of cameras.

It is to be understood that the present invention may be embodied with various changes, modifications and improvements, which may occur to those skilled in the art, without departing from the spirit and scope of the invention defined in the following claims.

What is claimed is:

1. A projection lens for a projection type of television system comprising in order from the image side to the object side a positive power first lens having a convex surface on the image side, a positive power second lens having a convex surface on the image side, a third biconcave lens, a positive power fourth meniscus lens having a convex surface on the object side and a positive power fifth lens having a convex surface on the image side, said projection lens satisfying the following conditions:

$$0.35 < F_{12}/F < 0.65$$

$$-0.30 < F_3/F < -0.13$$

$$0.5 < F_5/F < 0.85$$

$$0.35 < BF/F < 0.55$$

where $F_{12}$ is the composite focal length of the first and second lens, $F_3$ is the focal length of the third lens, $F_5$ is the focal length of the fifth lens, F is the focal length of the projection lens, and BF is the back focal distance of the projection lens.

2. A projection lens as defined in claim 1, and further comprising a color composing optical element disposed on the object side of the projection lens.

3. A projection lens as defined in claim 1 as described:

| Element | Radius of Curvature (mm) | Axial distance Between Surfaces (mm) | Nd | vd |
|---|---|---|---|---|
| $L_1$ | $R_1$ = 0.3593 | $D_1$ = 0.0975 | 1.6301 | 60.0 |
|  | $R_2$ = 2.5567 | $D_2$ = 0.0232 |  |  |
| $L_2$ | $R_3$ = 0.8185 | $D_3$ = 0.0668 | 1.6304 | 59.9 |
|  | $R_4$ = 1.2028 | $D_4$ = 0.1566 |  |  |
| $L_3$ | $R_5$ = −0.3651 | $D_5$ = 0.0228 | 1.8000 | 25.0 |
|  | $R_6$ = 0.4288 | $D_6$ = 0.0884 |  |  |
| $L_4$ | $R_7$ = −0.8840 | $D_7$ = 0.1089 | 1.6588 | 51.4 |
|  | $R_8$ = −0.3967 | $D_8$ = 0.0958 |  |  |
| $L_5$ | $R_9$ = 0.5886 | $D_9$ = 0.1262 | 1.7018 | 41.1 |
|  | $R_{10}$ = −4.4722 |  |  |  | where the projection lens comprises lens elements $L_1$ to $L_5$ having surfaces $R_1$ to $R_{10}$, reference distance numbers D given in millimeters (mm) are the progressive axial distances between adjacent surfaces, the index of refraction is given by Nd, and the dispersion vd is measured by the Abbe number.

4. A projection lens as defined in claim 1 as described:

| Element | Radius of Curvature (mm) | Axial distance Between Surfaces (mm) | Nd | vd |
|---|---|---|---|---|
| $L_1$ | $R_1$ = 0.2944 | $D_1$ = 0.0925 | 1.6204 | 60.4 |
|  | $R_2$ = 0.5476 | $D_2$ = 0.1559 |  |  |
| $L_2$ | $R_3$ = 0.3868 | $D_3$ = 0.0817 | 1.6204 | 60.4 |
|  | $R_4$ = 27.4476 | $D_4$ = 0.0591 |  |  |
| $L_3$ | $R_5$ = −0.2803 | $D_5$ = 0.0201 | 1.8052 | 25.5 |
|  | $R_6$ = 0.4195 | $D_6$ = 0.1614 |  |  |
| $L_4$ | $R_7$ = −0.9157 | $D_7$ = 0.1038 | 1.6700 | 47.2 |
|  | $R_8$ = −0.5622 | $D_8$ = 0.0023 |  |  |
| $L_5$ | $R_9$ = 0.9271 | $D_9$ = 0.0722 | 1.7015 | 41.1 |
|  | $R_{10}$ = −0.7941 |  |  |  | where the projection lens comprises lens elements $L_1$ to $L_5$ having surfaces $R_1$ to $R_{10}$, reference distance numbers D given in millimeters (mm) are the progressive axial distance between adjacent surfaces, the index of refraction is given by Nd, and the dispersion vd is measured by the Abbe number.

5. A projection lens as defined in claim 1 as described:

| Element | Radius of Curvature (mm) | Axial distance Between Surfaces (mm) | Nd | vd |
|---|---|---|---|---|
| $L_0$ | $R_0$ = ∞ | $D_0$ = 0.0836 |  |  |
|  | $R_1$ = 0.3007 | $D_1$ = 0.0932 | 1.6204 | 60.4 |
| $L_1$ | $R_2$ = 0.6069 | $D_2$ = 0.1576 |  |  |
|  | $R_3$ = 0.4082 | $D_3$ = 0.0789 | 1.6204 | 60.4 |
| $L_2$ | $R_4$ = 5.2038 | $D_4$ = 0.0639 |  |  |
|  | $R_5$ = −0.2777 | $D_5$ = 0.0201 | 1.8052 | 25.5 |
| $L_3$ | $R_6$ = 0.4321 | $D_6$ = 0.1421 |  |  |
|  | $R_7$ = −0.7541 | $D_7$ = 0.1059 | 1.6700 | 47.2 |
| $L_4$ | $R_8$ = −0.4968 | $D_8$ = 0.0023 |  |  |
|  | $R_9$ = 0.8614 | $D_9$ = 0.0746 | 1.7015 | 41.4 |
| $L_5$ | $R_{10}$ = −0.8225 | $D_{10}$ = 0.0540 |  |  |
|  | $R_{11}$ = ∞ | $D_{11}$ = 0.3556 | 1.5163 | 64.1 |
| $L_6$ | $R_{12}$ = ∞ |  |  |  | where the projection lens comprises lens elements $L_1$ to $L_5$ having surfaces $R_1$ to $R_{10}$, reference distance numbers D given in millimeters (mm) are the progressive axial distance between adjacent surfaces, the index of refraction is given by Nd, and the dispersion vd is measured by the Abbe number.

6. A projection lens as defined in claim 1 and further satisfying the following condition:

$$1.2 < R_7/R_8 < 3.2$$

where $R_8$ is the radius of curvature of the image side surface of the fourth lens element, and $R_9$ is the radius of curvature of the object side surface of the fourth lens element.

7. A projection lens as defined in claim 6, and further comprising a color composing optical element disposed on the object side of the projection lens.

8. A projection lens as defined in claim 6 as described:

| Element | Radius of Curvature (mm) | Axial distance Between Surfaces (mm) | Nd | vd |
|---|---|---|---|---|
| $L_1$ | $R_1$ = 0.3593 | $D_1$ = 0.0975 | 1.6301 | 60.0 |
|  | $R_2$ = 2.5567 | $D_2$ = 0.0232 |  |  |
| $L_2$ | $R_3$ = 0.8185 | $D_3$ = 0.0668 | 1.6304 | 59.9 |
|  | $R_4$ = 1.2028 | $D_4$ = 0.1566 |  |  |
| $L_3$ | $R_5$ = −0.3651 | $D_5$ = 0.0228 | 1.8000 | 25.0 |
|  | $R_6$ = 0.4288 | $D_6$ = 0.0884 |  |  |
| $L_4$ | $R_7$ = −0.8840 | $D_7$ = 0.1089 | 1.6588 | 51.4 |
|  | $R_8$ = −0.3967 | $D_8$ = 0.0958 |  |  |
| $L_5$ | $R_9$ = 0.5886 | $D_9$ = 0.1262 | 1.7018 | 41.4 |
|  | $R_{10}$ = −4.4722 |  |  |  | where the projection lens comprises lens elements $L_1$ to $L_5$ having surfaces $R_1$ to $R_{10}$, reference distance numbers D given in millimeters (mm) are the progressive axial distance between adjacent surfaces, the index of refraction is given by Nd, and the dispersion vd is measured by the Abbe number.

9. A projection lens as defined in claim 6 as described:

| Element | Radius of Curvature (mm) | Axial distance Between Surfaces (mm) | Nd | vd |
|---|---|---|---|---|
| $L_1$ | $R_1 = 0.3007$ | $D_1 = 0.0932$ | 1.6204 | 60.4 |
|  | $R_2 = 0.6069$ | $D_2 = 0.1576$ |  |  |
| $L_2$ | $R_3 = 0.4082$ | $D_3 = 0.0789$ | 1.6204 | 60.4 |
|  | $R_4 = 5.2038$ | $D_4 = 0.0639$ |  |  |
| $L_3$ | $R_5 = -0.2777$ | $D_5 = 0.0201$ | 1.8052 | 25.5 |
|  | $R_6 = 0.4321$ | $D_6 = 0.1421$ |  |  |
| $L_4$ | $R_7 = -0.7541$ | $D_7 = 0.1059$ | 1.6700 | 47.2 |
|  | $R_8 = -0.4968$ | $D_8 = 0.0023$ |  |  |
| $L_5$ | $R_9 = 0.8614$ | $D_9 = 0.0746$ | 1.7015 | 41.1 |
|  | $R_{10} = -0.8225$ |  |  |  | where the projection lens comprises lens elements $L_1$ to $L_5$ having surfaces $R_1$ to $R_{10}$, reference distance numbers D given in millimeters (mm) are the progressive axial distances between adjacent surfaces, the index of refraction is given by Nd, and the dispersion vd is measured by the Abbe number.

10. A projection lens as defined in claim 6 as described:

| Element | Radius of Curvature (mm) | Axial distance Between Surfaces (mm) | Nd | vd |
|---|---|---|---|---|
| $L_1$ | $R_1 = 0.2944$ | $D_1 = 0.0925$ | 1.6204 | 60.4 |
|  | $R_2 = 0.5476$ | $D_2 = 0.1559$ |  |  |
| $L_2$ | $R_3 = 0.3868$ | $D_3 = 0.0817$ | 1.6204 | 60.4 |
|  | $R_4 = 27.4476$ | $D_4 = 0.0591$ |  |  |
| $L_3$ | $R_5 = -0.2803$ | $D_5 = 0.0201$ | 1.8052 | 25.5 |
|  | $R_6 = 0.4195$ | $D_6 = 0.1614$ |  |  |
| $L_4$ | $R_7 = -0.9157$ | $D_7 = 0.1038$ | 1.6700 | 47.2 |
|  | $R_8 = -0.5622$ | $D_8 = 0.0023$ |  |  |
| $L_5$ | $R_9 = 0.9271$ | $D_9 = 0.0722$ | 1.7015 | 41.1 |
|  | $R_{10} = -0.7941$ |  |  |  | where the projection lens comprises lens elements $L_1$ to $L_5$ having surfaces $R_1$ to $R_{10}$, reference distance numbers D given in millimeters (mm) are the progressive axial distances between adjacent surfaces, the index of refraction is given by Nd, and the dispersion vd is measured by the Abbe number.

11. The projection lens of claim 1, wherein each of the first through fifth lenses consists of a single lens element.

12. A projection lens for a projection type of television system comprising in order from the image side to the object side a positive power first lens having a convex surface on the image side, a positive power second lens having a convex surface on the image side, a third biconcave lens, a positive power fourth meniscus lens having a convex surface on the object side and a positive power fifth lens having a convex surface on the image side, said projection lens satisfying the following conditions:

$0.35 < F_{12}/F < 0.65$ $-0.24 < F_3/F < -0.20$ $0.5 < F_5/F < 0.85$ $0.35 < BF/F < 0.55$ where $F_{12}$ is the composite focal length of the first and second lens, $F_3$ is the focal length of the third lens, $F_5$ is the focal length of the fifth lens, F is the focal length of the projection lens, and BF is the back focal distance of the projection lens.

\* \* \* \* \*